(12) United States Patent
Acharya et al.

(10) Patent No.: US 11,701,821 B2
(45) Date of Patent: *Jul. 18, 2023

(54) ADDITIVELY MANUFACTURING OF AMORPHOUS STRUCTURES

(71) Applicant: Hamilton Sundstrand Corporation, Charlotte, NC (US)

(72) Inventors: Ranadip Acharya, Rocky Hill, CT (US); Alexander Staroselsky, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/566,928

(22) Filed: Dec. 31, 2021

(65) Prior Publication Data

US 2022/0126511 A1 Apr. 28, 2022

Related U.S. Application Data

(62) Division of application No. 16/657,420, filed on Oct. 18, 2019, now Pat. No. 11,214,002.

(51) Int. Cl.
*B29C 64/188* (2017.01)
*B29C 64/153* (2017.01)
(Continued)

(52) U.S. Cl.
CPC .......... *B29C 64/153* (2017.08); *B22F 10/00* (2021.01); *B22F 10/28* (2021.01); *B22F 12/43* (2021.01); *B22F 12/53* (2021.01); *B29C 64/188* (2017.08); *B29C 64/209* (2017.08); *B29C 64/227* (2017.08); *B29C 64/245* (2017.08); *B29C 64/273* (2017.08); *B29C 64/386* (2017.08); *B29C 64/393* (2017.08); *B33Y 10/00* (2014.12); *B33Y 50/00* (2014.12); *B22F 10/366* (2021.01);
(Continued)

(58) Field of Classification Search
CPC ... B29C 64/141; B29C 64/153; B29C 64/188; B29C 64/194
See application file for complete search history.

(56) References Cited

U.S. PATENT DOCUMENTS

| 5,387,380 A | 2/1995 | Cima et al. |
| 8,961,860 B2 | 2/2015 | Eriksson et al. |

(Continued)

FOREIGN PATENT DOCUMENTS

| CN | 104084216 A | 10/2014 |
| CN | 106011847 A | 10/2016 |

(Continued)

OTHER PUBLICATIONS

Extended European search report for European Patent Application No. EP19215822.8, dated May 11, 2020.

*Primary Examiner* — Atul P. Khare
(74) *Attorney, Agent, or Firm* — Locke Lord LLP; Daniel J. Fiorello; Gabrielle L. Gelozin

(57) ABSTRACT

An additive manufacturing system configured to additively build an article can include an energy applicator, a build platform, and a powder nozzle configured to eject powder toward the build platform to be acted on by the energy applicator. The system can include a control module configured to control the energy applicator to create an amorphous structure forming at least a portion of the article.

12 Claims, 2 Drawing Sheets

(51) Int. Cl.
*B33Y 10/00* (2015.01)
*B29C 64/245* (2017.01)
*B29C 64/209* (2017.01)
*B29C 64/393* (2017.01)
*B29C 64/227* (2017.01)
*B29C 64/273* (2017.01)
*B22F 10/28* (2021.01)
*B22F 12/43* (2021.01)
*B22F 12/53* (2021.01)
*B22F 10/00* (2021.01)
*B29C 64/386* (2017.01)
*B33Y 50/00* (2015.01)
*B33Y 70/00* (2020.01)
*B33Y 30/00* (2015.01)
*B33Y 40/00* (2020.01)
*B33Y 50/02* (2015.01)
*B22F 12/00* (2021.01)
*B22F 12/48* (2021.01)
*B22F 12/55* (2021.01)
*B22F 10/366* (2021.01)
*B22F 10/80* (2021.01)

(52) U.S. Cl.
CPC ............ *B22F 10/80* (2021.01); *B22F 12/224* (2021.01); *B22F 12/48* (2021.01); *B22F 12/55* (2021.01); *B33Y 30/00* (2014.12); *B33Y 40/00* (2014.12); *B33Y 50/02* (2014.12)

(56) References Cited

U.S. PATENT DOCUMENTS

| | | | |
|---|---|---|---|
| 9,101,979 | B2 | 8/2015 | Hofmann et al. |
| 9,527,165 | B2 | 12/2016 | Bruck et al. |
| 10,012,088 | B2* | 7/2018 | Slavens ............... B23K 26/342 |
| 10,259,076 | B2 | 4/2019 | Suzuki et al. |
| 2014/0202595 | A1* | 7/2014 | Hofmann .............. C22C 45/001 |
| | | | 148/522 |
| 2015/0314373 | A1 | 11/2015 | Mironets et al. |
| 2016/0332371 | A1 | 11/2016 | Staroselsky et al. |
| 2017/0014907 | A1 | 1/2017 | Ng et al. |
| 2017/0173692 | A1 | 6/2017 | Myerberg et al. |
| 2017/0252851 | A1 | 9/2017 | Fulop et al. |
| 2017/0282462 | A1 | 10/2017 | Abe et al. |
| 2018/0304500 | A1 | 10/2018 | Putkis |
| 2021/0197260 | A1* | 7/2021 | Liu ........................ B22F 3/093 |

FOREIGN PATENT DOCUMENTS

| | | |
|---|---|---|
| CN | 108136663 A | 6/2018 |
| JP | 2000336403 A | 12/2000 |
| WO | WO-2019108043 A1 | 6/2019 |

* cited by examiner

ADDITIVELY MANUFACTURING OF AMORPHOUS STRUCTURES

CROSS REFERENCE TO RELATED APPLICATIONS

This application is a divisional application of U.S. patent application Ser. No. 16/657,420 filed on Oct. 18, 2019, the entire content of which is incorporated herein by reference.

FIELD

This disclosure relates to additive manufacturing, more specifically to additive manufacturing of amorphous structures.

BACKGROUND

Alloys used in additive manufacturing are primarily of polycrystalline/equiaxed microstructure with yield strength and fatigue resistance being the most sought after properties. However, the presence of defects and inhomogeneity in the as-built structure necessitates use of post-processing (e.g., heat treatment, HIP) that causes grain growth.

Such conventional methods and systems have generally been considered satisfactory for their intended purpose. However, there is still a need in the art for improved additive manufacturing systems and methods. The present disclosure provides a solution for this need.

SUMMARY

An additive manufacturing system configured to additively build an article can include an energy applicator, a build platform, and a powder nozzle configured to eject powder toward the build platform to be acted on by the energy applicator. The system can include a control module configured to control the energy applicator to create an amorphous structure forming at least a portion of the article.

The energy applicator can include a laser. The control module can be configured to pulse the laser. The control module can be configured to control the laser to cause an amorphous matrix formation cooling rate to form an amorphous matrix. The amorphous matrix formation cooling rate can be about $10^5$ K/s to about $10^6$ K/s or even higher, for example.

The energy applicator can include one or more acoustic transducers disposed on or in the build platform to provide vibration during additive manufacturing to the article and/or a portion thereof to cause formation of nanocrystal grains in the amorphous matrix. The one or more acoustic transducers can include a plurality of ultrasonic transducers. The plurality of transducers can be disposed in an array on or in the build platform. The control module can be configured to control the plurality of transducers independently of each other to produce vibration in a predetermined location of the build platform.

In accordance with at least one aspect of this disclosure, a non-transitory computer readable medium comprising computer executable instructions configured to cause a computer perform a method. The method can include any suitable method disclosed herein. For example, the method can include controlling an energy applicator (e.g., as disclosed above) of an additive manufacturing machine to create an amorphous structure forming at least a portion of the article.

The method can include pulsing the laser. The method can include controlling the laser to cause an amorphous matrix formation cooling rate (e.g., as disclosed above) to form an amorphous matrix.

The method can further include controlling one or more acoustic transducers disposed on or in a build platform to provide vibration during additive manufacturing to an article and/or a portion thereof being built to cause formation of nanocrystal grains in the amorphous matrix. The method can include controlling a plurality of transducers independently of each other to produce vibration in a predetermined location of the build platform.

In accordance with at least one aspect of this disclosure, a method can include additively manufacturing an article that includes an amorphous structure in at least a portion of the article. The method can include heating a powder and allowing the heated powder to cool at an amorphous matrix formation rate.

The method can include vibrating the heated powder during heating and/or after heating to form nanocrystal grains in an amorphous matrix. Vibrating can include vibrating at one or more ultrasonic frequencies. Vibrating can include vibrating an entire build area or vibrating a local portion being heated.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
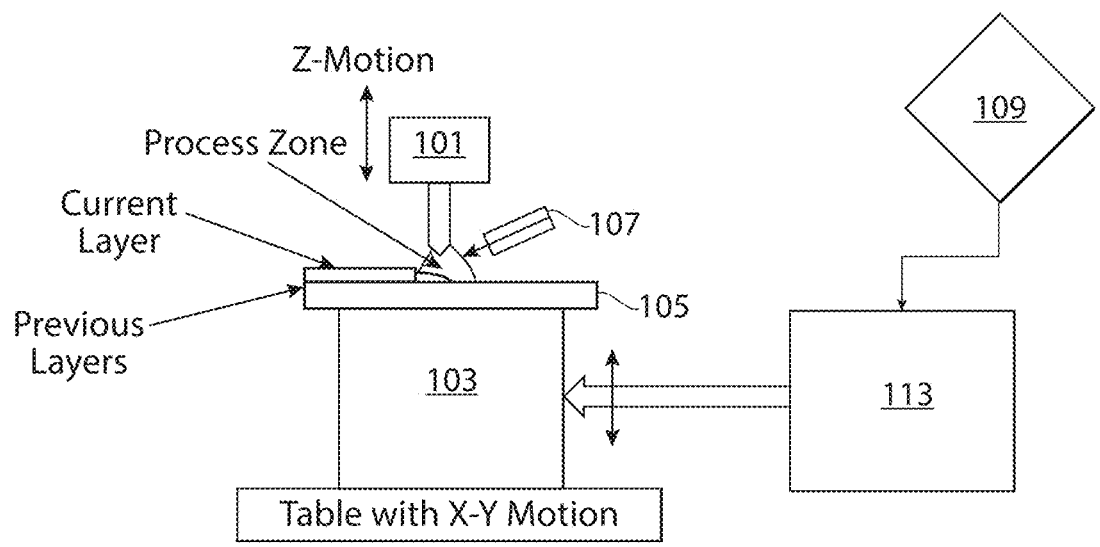
FIG. 1 is a schematic diagram of an embodiment of a system in accordance with this disclosure.
Figure 2:
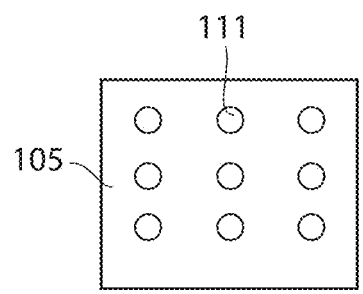
FIG. 2 is a schematic diagram of an embodiment of a transducer array in a build platform of the system of FIG. 1.
Figure 3:
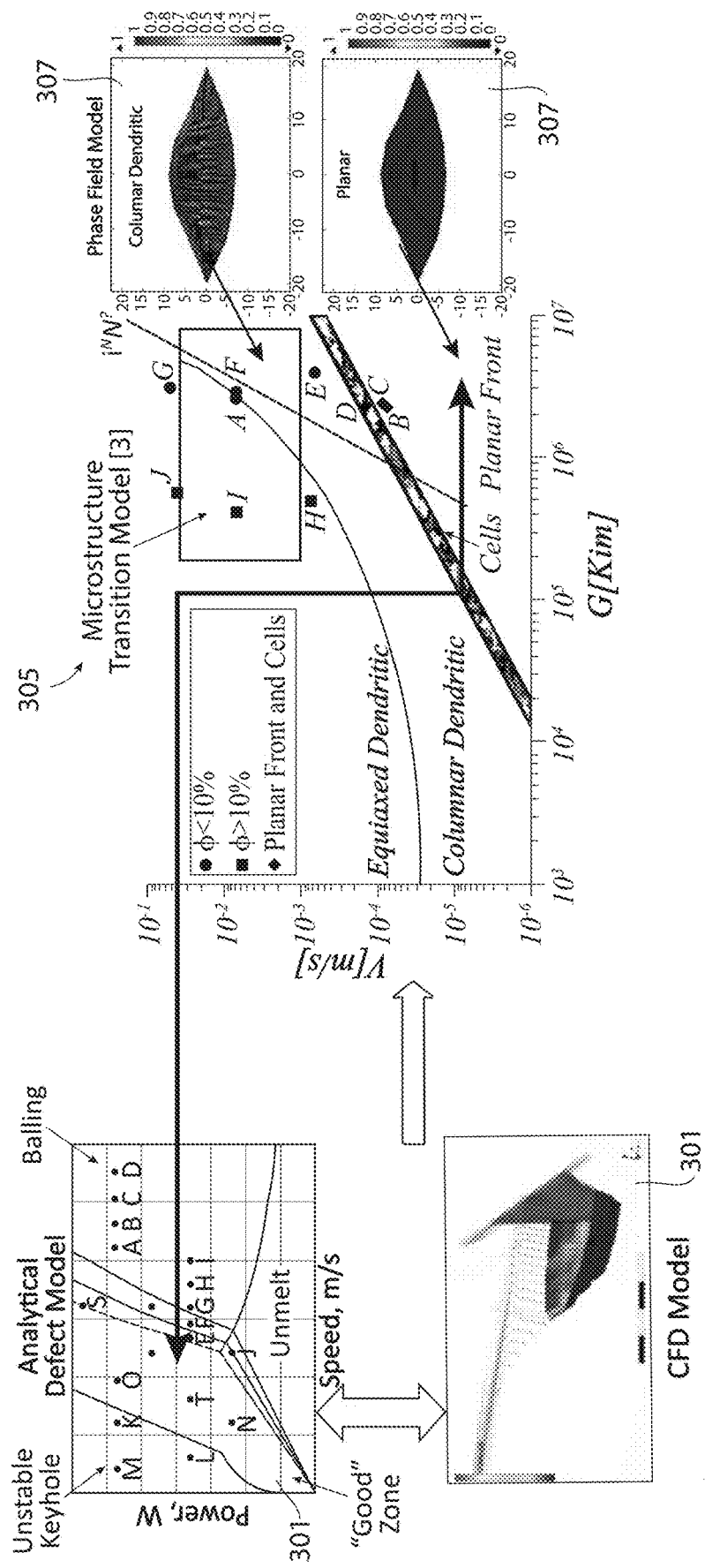
FIG. 3 shows a schematic diagram illustrating the use, e.g., by a control module, of computation fluid dynamics (CFD), a defect process map, a solidification map and phase field model to identify process zones and parameters that form amorphous microstructure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2 and 3. Certain embodiments described herein can be used to produce one or more articles having amorphous structure (e.g., amorphous matrix with nanocrystal grains) forming at least a portion of the article (e.g., an outer surface thereof).

Referring to FIG. 1, an additive manufacturing system 100 configured to additively build an article (not shown) can include an energy applicator (e.g., comprised of laser 101 and transducer 103). The system 100 can include a build platform 105 and a powder nozzle 107 configured to eject powder (e.g., metal powder) toward the build platform 105 to be acted on by the energy applicator (e.g., heated and/or vibrated).

The system 100 can include a control module 109 configured to control the energy applicator (e.g., laser 101 and/or transducer 103) to create an amorphous structure forming at least a portion of the article. The amorphous structure can be a structure in which at least a portion (e.g., the entirety, an out surface thereof, etc.) can have an amorphous matrix as appreciated by those having ordinary skill in the art. In certain embodiments, the amorphous structure can include nanocrystalline grains disposed within the amorphous matrix (e.g., in any suitable proportion). In certain embodiments, there may be no nanocrystalline grains. The control module 109 can include any suitable hardware and/or software module(s) in accordance with this disclosure and/or as appreciated by those having ordinary skill in the art.

The energy applicator can include a laser 101, for example. Any other suitable heat source (e.g., an electron beam) is contemplated herein. The control module 109 can be configured to pulse the laser, for example. The control module 109 can be configured to control the laser 101 to cause an amorphous matrix formation cooling rate to form an amorphous matrix. The amorphous matrix formation cooling rate can be about $10^5$ K/s to about $10^6$ K/s or higher, for example. Therefore, the control module 109 can be configured to pulse the laser 101 and/or control power output of the laser to maintain a suitable cooling rate to achieve an amorphous matrix.

The energy applicator can also include one or more acoustic transducers 103 disposed on or in the build platform 105 to provide vibration during additive manufacturing to the article and/or a portion thereof to cause formation of nanocrystal grains in the amorphous matrix. Referring additionally to FIG. 2, the one or more acoustic transducers 103 can include a plurality of ultrasonic transducers 111, for example. The plurality of transducers 111 can be disposed in an array (e.g., as shown in rows and columns) on or in the build platform 105. The control module 109 can be configured to control the plurality of transducers 111 (e.g., at least two thereof) independently of each other to produce vibration (e.g., about 50 KHz and up) in a predetermined location (e.g., where the location of heat application is) of the build platform 105.

The control module 109 can be operatively connected to a power supply 113 that provides power to transducer 103 to control the output power and/or frequency of the transducer 103. Any other suitable arrangement is contemplated herein for the control module 109 to control the transducer 103.

The system 100 can include any suitable number of powder nozzles 107 and can use any suitable powder or combinations thereof to form an amorphous structure (e.g., with nanocrystal grains). Referring additionally to FIG. 3, the control module 109 can be configured to determine process parameters (e.g., laser power, pulsing rate, x-y scan speed, transducer amplitude and/or frequency) as a function of one or more models for a selected powder chemistry. For example, the control module 109 can use a computational fluid dynamics (CFD) model 301 (e.g., to compute temperature gradient G and solidification speed V from process parameter), a defect model 303 (e.g., for determining a proper scan speed vs. power), a microstructure transition model 305 (e.g., for determining the effects of solidification speed V and cooling gradient G), and a phase field model 307 (e.g., for determining whether the final material is amorphous). The control module 109 can be configured to utilize one or more of the above models in any suitable manner, and/or or to use any other suitable models, to form an amorphous structure.

The powder used can be selected to be able to create an amorphous structure. For example, materials that can form an amorphous structure include, but are not limited to, aluminum and titanium based structures for example.

The control module 109 can be configured to create articles with different characteristics in different portions thereof. For example, one layer can be amorphous, and another other layer can have grains. In certain embodiments, and outer layer or layers of an article can amorphous and/or have nanocrystal grains) while the bulk can be normally manufactured to have a bulk or regular material.

In accordance with at least one aspect of this disclosure, a non-transitory computer readable medium comprising computer executable instructions configured to cause a computer perform a method. The method can include any suitable method disclosed herein. For example, the method can include controlling an energy applicator (e.g., as disclosed above) of an additive manufacturing machine to create an amorphous structure forming at least a portion of the article.

The method can include pulsing the laser. The method can include controlling the laser to cause an amorphous matrix formation cooling rate (e.g., as disclosed above) to form an amorphous matrix.

The method can further include controlling one or more acoustic transducers disposed on or in a build platform to provide vibration during additive manufacturing to an article and/or a portion thereof being built to cause formation of nanocrystal grains in the amorphous matrix. The method can include controlling a plurality of transducers independently of each other to produce vibration in a predetermined location of the build platform.

In accordance with at least one aspect of this disclosure, a method can include additively manufacturing an article that includes an amorphous structure in at least a portion of the article. The method can include heating a powder and allowing the heated powder to cool at an amorphous matrix formation rate.

The method can include vibrating the heated powder during heating and/or after heating to form nanocrystal grains in an amorphous matrix. Vibrating can include vibrating at one or more ultrasonic frequencies. Vibrating can include vibrating an entire build area or vibrating a local portion being heated. The method can include any other suitable method(s) and/or portion(s) thereof.

Traditional final microstructures can contain larger grain size than forged counterpart, resulting in reduction of yield strength and fatigue resistance. On the other hand, amorphous structure or metal glass have shown excellent elastic strain, and fracture resistance but tend to be more brittle. A hybrid structure with crystalline grains in amorphous matrix can be used to accommodate some plastic strain and imparts ductility while maintaining high fatigue resistance and elastic strain.

Embodiments can create nanocrystalline grain structures using ultrasonic assisted pulsed laser based directed energy deposition. Embodiments can use process models to obtain a hybrid structure containing nanocrystalline grains in amorphous matrix through ultrasonic assisted pulsed laser.

The pulsed laser can fabricate an amorphous matrix through a phase field-model predicted process region where cooling rate is higher than a suitable rate, e.g., as disclosed above. Ultrasonic vibration can be induced at layer level and/or within the process zone to specifically break the solidification front and create additional seeds at layer level or just within the process zone. This will form nanocrystalline grains in the amorphous matrix. An arrangement of transducers can be included in build platform to induce crystalline transition locally in a regular array.

Embodiments can utilize a pulsed laser with a controlled scan strategy to create amorphous microstructure, while an ultrasonic assisted laser engineered net shaping (LENS) process can refine grain structure. Ultrasonic vibration can break the growing dendrites and create seeds at multiple locations within the melt pool, thus refining grain structure and resulting in nanocrystalline grains. Thus embodiments include additive manufacturing methods for minimizing brittleness of deposited amorphous materials by introducing nanocrystalline microstructure. Embodiments can use a physics-driven model assisted process map to create a hybrid structure comprised of nanocrystalline structure in amorphous matrix. Embodiments can utilize an arrangement of multiple powder nozzles (e.g., in directed energy deposition process) that can feed a different composition of materials at bulk, near surface, and at surface.

Embodiments can be applied to any suitable field of structures, e.g., aerospace structures for example. For example, a fan blade can be manufactured to have outer layers be amorphous, while a bulk material is of normal composition. For example, this disclosure can be applied to the fabrication of strain wave gears with high transmission ratio and actuators as well as for aero-structures and vehicle components. Embodiments can be used for light weighting while improving the performance (e.g., fatigue and yield properties improvements with grain refinement).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A non-transitory computer readable medium comprising computer executable instructions configured to cause a computer to perform a method, the method comprising:
controlling an energy applicator of an additive manufacturing system to create an amorphous matrix forming cooling rate in a metal powder deposited on a build platform so as to form an amorphous matrix having nanocrystal grains in predetermined locations of the powder, thereby forming at least a portion of an article, wherein the energy applicator comprises a laser creating the amorphous matrix forming cooling rate and a plurality of acoustic transducers disposed on or in the build platform for inducing formation of the nanocrystal grains in the predetermined locations during said cooling.

2. The non-transitory computer readable medium of claim 1, wherein the method includes pulsing the laser.

3. The non-transitory computer readable medium of claim 1, wherein the amorphous matrix forming cooling rate is about $10^5$ K/s or higher.

4. The non-transitory computer readable medium of claim 1, wherein the amorphous matrix forming cooling rate is about $10^5$ K/s to about $10^6$ K/s.

5. The non-transitory computer readable medium of claim 1, wherein the method further includes controlling the plurality of acoustic transducers disposed on or in the build platform to provide vibration during additive manufacturing of the article and/or a portion thereof being built.

6. The non-transitory computer readable medium of claim 5, wherein the plurality of acoustic transducers include a plurality of ultrasonic transducers, wherein the plurality of transducers are disposed in an array on or in the build platform, and wherein the method includes controlling the plurality of transducers independently of each other to produce vibration in predetermined locations of the build platform.

7. A method, comprising:
additively manufacturing from a metal powder on a build platform to form an article that includes an amorphous structure having nanocrystal grains in at least a portion of the article; and
controlling an energy applicator of an additive manufacturing system to create an amorphous matrix forming cooling rate in the powder so as to form the amorphous matrix having nanocrystal grains in predetermined locations of the powder, thereby forming at least a portion of the article, wherein the energy applicator comprises a laser creating the amorphous matrix forming cooling rate and a plurality of acoustic transducers disposed on or in the build platform for inducing formation of the nanocrystal grains in the predetermined locations during said cooling.

8. The method of claim 7, wherein the method includes heating the powder and allowing the heated powder to cool at an amorphous matrix forming rate.

9. The method of claim 8, further comprising vibrating the heated powder during the heating and/or after the heating so as to form the nanocrystal grains in the amorphous matrix.

10. The method of claim 9, wherein the vibrating includes vibrating at one or more ultrasonic frequencies.

11. The method of claim 10, wherein the vibrating includes the vibrating an entire build area for the powder or vibrating a local portion of the powder being heated.

12. A method, comprising:
additively manufacturing an article that includes an amorphous structure having nanocrystal grains in at least a portion of the article; and
controlling a laser and one or more acoustic transducers of an energy applicator of an additive manufacturing system to create an amorphous matrix forming cooling rate in a metal powder deposited on a build platform so as to form the amorphous matrix having the nanocrystal grains in predetermined locations of the powder, thereby forming at least a portion of the article;

wherein controlling the laser includes creation of the amorphous matrix forming cooling rate; and wherein controlling the one or more transducers includes formation of the nanocrystal grains in the predetermined locations during said cooling, the one or more transducers disposed on or in the build platform.

* * * * *